(12) United States Patent
Reznikov et al.

(10) Patent No.: US 7,903,228 B2
(45) Date of Patent: Mar. 8, 2011

(54) MATERIAL FOR LIQUID CRYSTAL CELL

(75) Inventors: Yurii Reznikov, Kyiv (UA); Anatoliy Glushchenko, Kent, OH (US); Victor Reshetnyak, Kyiv (UA); John West, Munroe Falls, OH (US)

(73) Assignee: Kent State University, Kent, OH (US)

( * ) Notice: Subject to any disclaimer, the term of this patent is extended or adjusted under 35 U.S.C. 154(b) by 551 days.

(21) Appl. No.: 10/471,195

(22) PCT Filed: Jan. 10, 2003

(86) PCT No.: PCT/US03/00861
§ 371 (c)(1), (2), (4) Date: Mar. 25, 2004

(87) PCT Pub. No.: WO03/060598
PCT Pub. Date: Jul. 24, 2003

(65) Prior Publication Data
US 2004/0156008 A1    Aug. 12, 2004

Related U.S. Application Data

(63) Continuation of application No. PCT/US03/00861, filed on Jan. 10, 2003.

(60) Provisional application No. 60/347,475, filed on Jan. 10, 2002.

(51) Int. Cl.
*C09K 19/02* (2006.01)

(52) U.S. Cl. .......... 349/172; 349/171; 349/184; 349/163

(58) Field of Classification Search .................. 349/171, 349/172, 184, 163–166
See application file for complete search history.

(56) References Cited

U.S. PATENT DOCUMENTS

| | | | | |
|---|---|---|---|---|
| 447,659 | A | * | 3/1891 | Higashii et al. .................. 49/159 |
| 4,417,785 | A | | 11/1983 | Nakamura |
| 4,701,024 | A | * | 10/1987 | Kobayashi et al. ........... 349/166 |
| 5,434,685 | A | * | 7/1995 | Pirs et al. ......................... 349/88 |
| 5,515,190 | A | * | 5/1996 | Ogawa et al. ................. 349/124 |
| 5,540,858 | A | * | 7/1996 | Yoshinaga et al. ....... 252/299.01 |
| 5,729,320 | A | | 3/1998 | Eidenschink et al. |

(Continued)

FOREIGN PATENT DOCUMENTS

| | | |
|---|---|---|
| JP | 01-267516 | 10/1989 |
| JP | 03160415 | 7/1991 |
| JP | 04-180021 | 6/1992 |
| JP | 04180021 A | 6/1992 |
| JP | 08-062586 | 3/1996 |
| JP | 2003050385 | 2/2003 |

OTHER PUBLICATIONS

Attached JP 01-142713 abstract machine translated.*

(Continued)

*Primary Examiner* — David Nelms
*Assistant Examiner* — Lucy P Chien
(74) *Attorney, Agent, or Firm* — Fay Sharpe LLP

(57) ABSTRACT

A liquid crystal device comprises ferroelectric particles suspended in a liquid crystal material. A method for fabricating a light-modulating device is also disclosed. The method comprises the steps of providing a pair of substrates with a cell gap therebetween, wherein electrodes are disposed on the facing surfaces of the substrates, and permanently disposing a suspension of ferroelectric particles in a liquid crystal material into said cell gap. A method of generating an image comprises providing a pair of substrates with a cell gap therebetween, providing transparent electrodes on each of said substrates adjacent to the cell gap, permanently disposing a suspension of ferroelectric particles in a liquid crystal material within the cell gap, and applying an electric field across the electrodes.

24 Claims, 6 Drawing Sheets a b

U.S. PATENT DOCUMENTS

| | | | | |
|---|---|---|---|---|
| 5,817,255 | A | * | 10/1998 | Tanaka et al. .................. 252/582 |
| 5,923,394 | A | * | 7/1999 | Miyazaki et al. .............. 349/172 |
| 6,108,061 | A | * | 8/2000 | Sako et al. ....................... 349/85 |
| 6,127,283 | A | * | 10/2000 | Gal-Or et al. .................. 438/785 |
| 6,130,190 | A | * | 10/2000 | Gunsel et al. .................. 508/204 |
| 6,160,788 | A | * | 12/2000 | Kobayashi et al. ........ 369/275.1 |
| 6,409,983 | B1 | * | 6/2002 | Choi et al. ..................... 423/598 |
| 7,346,248 | B2 | | 3/2008 | Atwater et al. |
| 2003/0081162 | A1 | * | 5/2003 | Miller ........................... 349/129 |
| 2004/0156008 | A1 | | 8/2004 | Reznikov et al. |
| 2007/0200093 | A1 | | 8/2007 | West et al. |

OTHER PUBLICATIONS

Bachmann, R. and Barner, K. "Stable suspensions of ferroelectric BaTio3-Particles", *Solid State Communications*, vol. 68, No. 9, pp. 865-869. Pergamon Press plc. Great Britain.*

Müller, J.-u and Bärner, K., "Polydisperse Suspensions of $BaTiO_3$-Particles", *Ferroelectrics*, vol. 108, pp. 83-88, 1990. Gordon and Breach Science Publishers S.A., USA.

Reznikov, Y., Buchnev, O., and Tereshchenko, O., "Ferroelectric nematic suspension", *Applied Physics Letters*, vol. 82, No. 12, pp. 1917-1919, Mar. 2003. © 2003 American Institute of Physics.

Schurian, A. and Bärner, K., "Stable Suspensions of Ferroelectric nm-$LiNbO_3$-andnm-$PbTiO_3$-Particles in Hydrocarbon Carrier Liquids", *Ferroelectric Letters*, vol. 20, pp. 169-176, 1996. © OPA (Overseas Publishers Association) Amsterdam B.V.

Schurian, A., Söder, J., Bärner, K., and Lin, Jun, "Scattering cell based on ferroelectric nm-particle suspensions", *Journal of Electrostatics 40 & 41*, pp. 205-210, 1997. © Elsevier Science B.V.

Anatoliy Glushchenko et al., "Applications of ferroelectric particles/liquid crystal colloids"; XP-002486847, Database Compendex (On-line) Engineering Information, Inc., New York, NY, US, Database accession No. E20072110615456 (Published on-line Sep. 2, 2007) and PROC SPIE INT SOC OPT ENG, Proceedings of SPIE—The International Society for Optical Engineering, Emerging Liquid Crystal Technologies II 2007, Vo. 6487, Feb. 9, 2007.

* cited by examiner

MATERIAL FOR LIQUID CRYSTAL CELL

This application is a National Stage Entry of PCT/US03/00861, filed Jan. 10, 2003, which is based on and claims priority to U.S. Provisional Application No. 60/347,475, filed Jan. 10, 2002.

BACKGROUND OF THE INVENTION

Liquid crystals (LC) consist of anisotropic molecules. The average direction of the long molecular axes is called the director, d. Reorientation of the director caused by the application of an external electric field is the basis of operation of most LC devices. The basic unit of LC devices is a LC cell, which consists of two substrates with LC material sandwiched in between.

The sensitivity of a LC material to an applied electric field is determined by the dielectric anisotropy, $\Delta\epsilon_a$, and spontaneous polarization, P. P has a nonzero value only for some chiral smectic LC phases. The higher the $\Delta\epsilon_a$ and P, the lower are the operating voltage and the faster the electro-optical response of the LC device and thereby, the faster the switching time between light and dark states of the LC cell.

Nematic LC's are the most commonly used LC materials. Their electro-optical response is typically related to the square of the electric field. To increase $\Delta\epsilon_a$ and P, multi-component LC mixtures have been developed and special molecular dopants have been synthesized. This approach is extremely laborious and very expensive.

Ferroelectric particles are particles which have a spontaneous electric polarization that is reversible by an electric field. It is known that the sensitivity of isotropic liquids to an applied electric field can be increased by doping with ultrafine (less than 1 micrometer (μm) size) ferroelectric particles. For example, Bachmann and Bärner showed that ferroelectric $BaTiO_3$ particles that have been finely milled in the presence of surfactant will form a stable suspension in heptane ("Stable Suspensions of Ferroelectric BaTiO3-Particles," *Solid State Communications*, 68(9), 865-869 (1988)). The particles had an average radius of about 10 nm. The birefringence of the suspension, which is impossible to achieve in a pure heptane matrix, was controlled by application of an electric field.

Müller and Bärner suggested that a radius of approximately 20 nm was the size distribution cut-off for $BaTiO_3$ particles for maintaining a permanent dipole moment, with only smaller particles maintaining the permanent dipole moment ("Polydisperse Suspensions of $BaTiO_3$-Particles," *Ferroelectrics*, 108, 83-88 (1990)). More recently, Schurian and Bärner produced stable ferroelectric suspensions of nanometer sized particles of $LiNbO_3$ and $PbTiO_3$ in a hydrocarbon carrier. These suspensions displayed similar birefringence to that of $BaTiO_3$ suspensions. Ferroelectric particles having an average radius of about 10-15 nanometers (nm) were determined to carry a permanent dipole moment of about 2000 Debye (De). Suspensions of nanometer size ferroelectric particles were also created by Schurian et al. by a method which included chemical precipitation of the particles and the use of alternate stabilizers (*Journal of Electrostatics*, 40 & 41, 205-210 (1997)).

None of these studies however, examined the behavior of ferroelectric particles in a suspension of liquid crystal or other anisotropic material.

BRIEF SUMMARY OF THE INVENTION

It is, therefore, an aspect of the present invention to provide a liquid crystal cell with a fast response time and low voltage requirements utilizing a suspension of ferroelectric particles in a liquid crystal material. It is another aspect of the present invention to provide a method of making a liquid crystal cell containing a suspension of ferroelectric particles in a liquid crystal material.

This invention provides a liquid crystal device consisting of ferro-particles suspended in a liquid crystal (LC) material and a method for fabricating a light-modulating device utilizing this suspension.

At least one or more of the foregoing aspects, together with the advantages thereof over the known art relating to liquid crystal displays (LCDs), which shall become apparent from the specification which follows, are accomplished by the invention as herein after described and claimed.

In general, the present invention provides a liquid crystal device comprising ferroelectric particles suspended in a liquid crystal material. The liquid crystal device may additionally contain a polymer disposed in the suspension of ferroelectric particles and liquid crystal material. The present invention may be useful as an electro-optical device or as an information display device. The device may also contain a pair of opposed substrates, each substrate having an electrode facing the other substrate, with the ferroelectric particles suspended in a liquid crystal material disposed between the substrates. The device may optionally contain an alignment material disposed on one or both of the electrodes.

The present invention also provides a method for fabricating a light-modulating device. The method comprises the steps of providing a pair of substrates with a cell gap therebetween and electrodes disposed on at least one facing surface of the substrates, and permanently disposing a suspension of ferroelectric particles in a liquid crystal material into the cell gap.

The present invention also provides a method of generating an image. The method includes providing a pair of substrates with a cell gap therebetween, providing a transparent electrode on at least one of the substrates adjacent to said cell gap, permanently disposing a suspension of ferroelectric particles in a liquid crystal material within the cell gap; and applying an electric field across the electrodes.

DETAILED DESCRIPTION OF THE INVENTION

Figure 1:
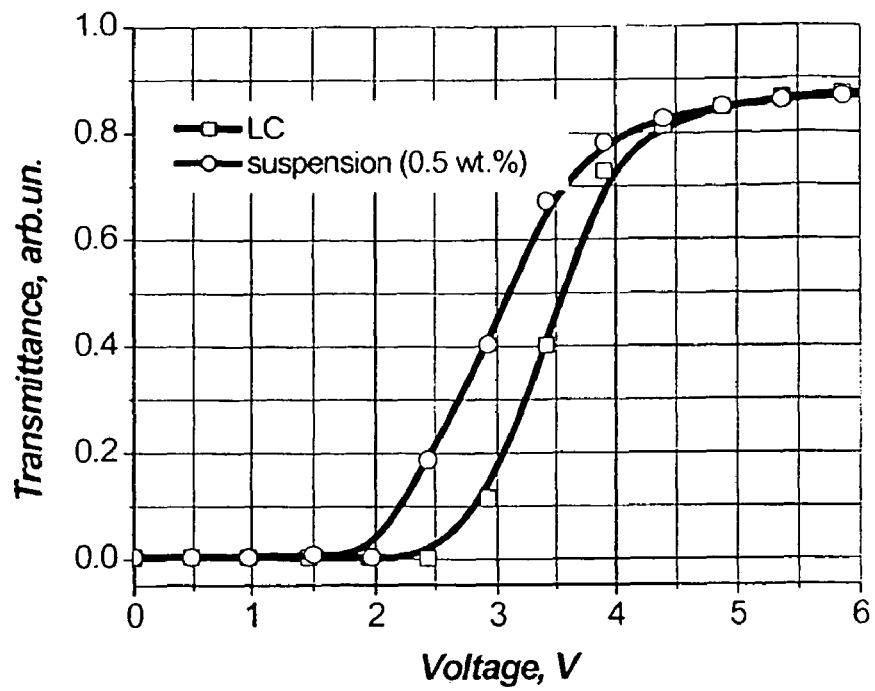
FIG. 1 is a graph showing the dependence of the transmission of a twist cell filled with ferroelectric particle/LC K15 suspension (circles) and pure LC (squares) on the applied ac-voltage.

The present invention is directed toward liquid crystal device consisting of ferro-particles suspended in a liquid crystal (LC) material. The liquid crystal device can be used for information displays, electro-optical devices, telecommunication systems and optical processing. To stabilize the suspension, a polymer network may be included in the suspension. The ferroelectric LC suspensions possess advanced electro-optic characteristics in comparison to traditional materials and devices.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention pertains.

In the present invention, ultra-fine ferroelectric particles are added to a LC material to improve and control the electro-optical characteristics. Optimally, the ferroelectric particles are smaller than the limits of unaided human vision, thereby providing increased speed and sensitivity to an electric field without harming the appearance of a LCD. The particle should also be small enough to incorporate into the LC matrix without disturbing the orientation of the LC. Typically, the particles are, on average, smaller than 1 μm in any dimension, preferably 0.5 μm or less. In one particular example, the particles have an average diameter of about 200 nm or less. In another example, the particles have an average diameter of about 20 nm or less. In still another example, the particles have an average diameter of about 10 nm.

Ferroelectric particles possess an extra high dielectric anisotropy, $\Delta\epsilon^{ferro}$, and have a spontaneous polarization, P, at temperatures less than the Curie temperature ($T_{Curie}$), the temperature at which the spontaneous polarization of ferroelectric material disappears. The Curie temperature will vary with the ferroelectric material. For example, $T_{Curie}$ for $BaTiO_3$ is about 108° C., while for $Sn_2P_2S_6$, $T_{Curie} \approx 66°$ C.

Owing to their anisotropic properties, ferro-particles are orientationally ordered in the anisotropic LC matrix. Although not wishing to condition patentability on any particular theory, it is believed that interaction between the particles' surface and the director of the LC causes a collective response of the suspension to an applied electric field. The effective value of the dielectric anisotropy of the suspension can be roughly estimated as $\Delta\epsilon_{eff}^{susp} \approx \Delta\epsilon + C \cdot \Delta\epsilon^{ferro}$, where C is the volume ratio of ferro-particles to LC matrix. Since the value $\Delta\epsilon^{ferro}$ can be of the order of $10^3$-$10^4$ and the value $\Delta\epsilon$ is of the order of 10, one can produce $\Delta\epsilon_{eff}^{susp}$ of a value up to about 100 for $C=10^{-1}$-$10^{-2}$. The added particles therefore decrease the operating voltage of LC devices and increase the switching speed of the LC suspension.

Application of an electric field may align the suspension of ferro-particles in the nematic LC due to dipole ordering of the ferro-particles. In this case, in addition to the dielectric quadratic response proportional to $\Delta\epsilon^{susp}E^2$, a linear electric response proportional to $P \cdot E$ appears. It results in a faster response and lower driving voltage of the suspension.

The basic procedure of producing a suspension of ferroelectric particles in a LC may include the following steps:

1. Milling of the ferroelectric material. Grains of ferroelectric powder are mixed with a slow evaporating liquid carrier (e.g. heptane, kerosene etc) and a surfactant agent. The mixture is milled until an ultra-fine size of the particles covered with the surfactant molecules is obtained.
2. Fractionalation of the suspension in a liquid carrier. After milling the mixtures largest particles were removed by sedimentation. The homogeneous fraction of the resulting suspension is segregated in a column where particles of different size are separated by gravity forces.
3. Producing of the suspension in a liquid crystal. The suspension in a liquid carrier is mixed with a liquid crystal (it could be any kind of thermotropic LC which is miscible with the carrier) followed by evaporating of the carrier.
4. Additional stabilization of the suspension. Including a polymer network may additionally stabilize the resulting suspension. For example, a photopolymerizable material is added to the suspension and an LC cell filled with the suspension is irradiated with UV light. In another example, a polymerizable material is added to the suspension and phase separation of the polymerizable material is induced, such as by cooling, with subsequent or concurrent polymerization of the polymerizable material.

The procedure can be varied in details. For example, the grain of ferro-particles can be mixed with a surfactant without liquid carrier, and a LC matrix itself can serve as a liquid carrier.

Any type of LC material may be used in the suspension of this invention. Although examples are presented using nematic liquid crystal material, the invention is not limited thereto. Accordingly, the LC may be selected from other types of liquid crystal material including nematic, chiral nematic, and smectic liquid crystal materials, among others.

As mentioned above, ferroelectric particles are particles which have a spontaneous electric polarization that is reversible by an electric field. Any particle that has this property may be utilized in the present invention. Suitable ferroelectric particles include particles of $LiNbO_3$, $PbTiO_3$, $BaTiO_3$, and $Sn_2P_2S_6$. Other particles may also be used provided that they exhibit a spontaneous electric polarization.

The ferroelectric particles may be present in the suspension in an amount which permits the ferroelectric particles to be suspended without significant aggregation of the particles. This will, at least in part, depend on the surfactant or other material used to prevent aggregation. In one example, the ferroelectric particles are suspended in the liquid crystal material at a percentage of about 4 percent by weight or less compared to the liquid crystal material. In another example, the ferroelectric particles are suspended in the liquid crystal material at a percentage of about 1 percent by weight or less compared to the liquid crystal material. In still another example, the ferroelectric particles are suspended in the liquid crystal material at a percentage of about 0.5 percent by weight or less compared to the liquid crystal material.

The suspension of ferroelectric particles in a liquid crystal material may additionally comprise a polymerizable material. The polymerizable material may be polymerized within the cell. When a polymerizable material is present, the method of the present invention additionally comprises the step of inducing polymerization of the polymerizable material. The method may additionally comprise the step of inducing phase separation of the polymer and liquid crystal material, for example, by cooling the mixture.

In creating a liquid crystal cell according to the present invention, the ferroelectric particle/LC suspension may be disposed between a pair of facing substrates, at least one of which is transparent. The cell may also contain an electrode disposed on the facing surface of each of the substrates to produce an electric field within the cell. The electrodes also may be transparent, such as those made of indium or indium tin oxide (ITO). The electrodes can be continuous on the surface of the substrate, or they may be interdigitated. The substrates may additionally comprise an alignment layer on the facing surface of the substrate.

To demonstrate the effectiveness of the present invention, several ferroelectric particle suspensions in liquid crystal material were made as follows. The following examples should not be viewed as limiting the scope of the invention. The claims will serve to define the inventions.

Ferroelectric powder CTBS-3 from Physics-Chemystry Institute of Donetsc (National Academy of Sciences of Ukraine), having a characteristic grain size of 1 μm, and $\in \approx 2300$, was mixed with a solution of oleic acid as surfactant (Aldrich) in heptane in a weight ratio of 1:2:10. The mixture was dispersed in an ultrasonic dispergator (UZDH-2T) at a frequency (ν) of 22 kH, and power (P) of 400 W for 2 minutes, followed by milling in a vibration mill (Fritsch Pulaerisette) for 100 hours.

The resulting suspension was poured into a glass column and allowed to segregate for 1 day by size. The faction of the suspension containing particles less than about 0.5 μm was removed and mixed with the LC, 4-4'-pentylcyanobiphenyl (available as K15 from EM Industries), at a weight proportion of 1:100. This mixture was dispersed in an ultrasonic dispergator for 5 minutes followed by evaporation of the heptane with a forevacuum pump. The resulting suspension contained about 0.5 weight percent ferro-particles in the LC matrix.

The resulting suspension was tested in a LC twist cell. The LC twist cell consisted of two glass substrates and the suspension disposed between the substrates. The facing surfaces of the substrates were covered with an indium tin oxide (ITO) transparent electrode. The electrodes were covered with rubbed alignment layers consisting of NISSAN 7792 polyimide from Nissan. A droplet of the suspension was put on one of the substrates and the second substrate was placed onto the first substrate. The substrates were separated by rigid 20 μm spacers and were oriented such that the rubbing directions of the polyimide layers were perpendicular to each other. The twist cell then was sealed with epoxy glue.

The electro-optic characteristics of the twist cell were measured by a standard methods in the art (see, for example, Blinov and Chigrinov, *Electrooptic Effects in Liquid Crystal Materials*, Springer-Verlag, NY, 1994). These methods are integrated in Electro-Optic Measurements (EOM) software package developed in Dr. Phil Bos' research group at the Liquid Crystal Institute, Kent State University. The cell was put between crossed polarizers, and the directions of rubbing of the aligning layers were either parallel or perpendicular to the polarizer axes (normally black mode). An electric field (frequency, ν=1 kH) was applied to the ITO-electrodes of the cell and the dependence of the transparency of the system, T, on the applied voltage, V, was measured. In addition, the change of the transmission after abrupt switching on and switching off of an electric field was measured.

Figure 2:
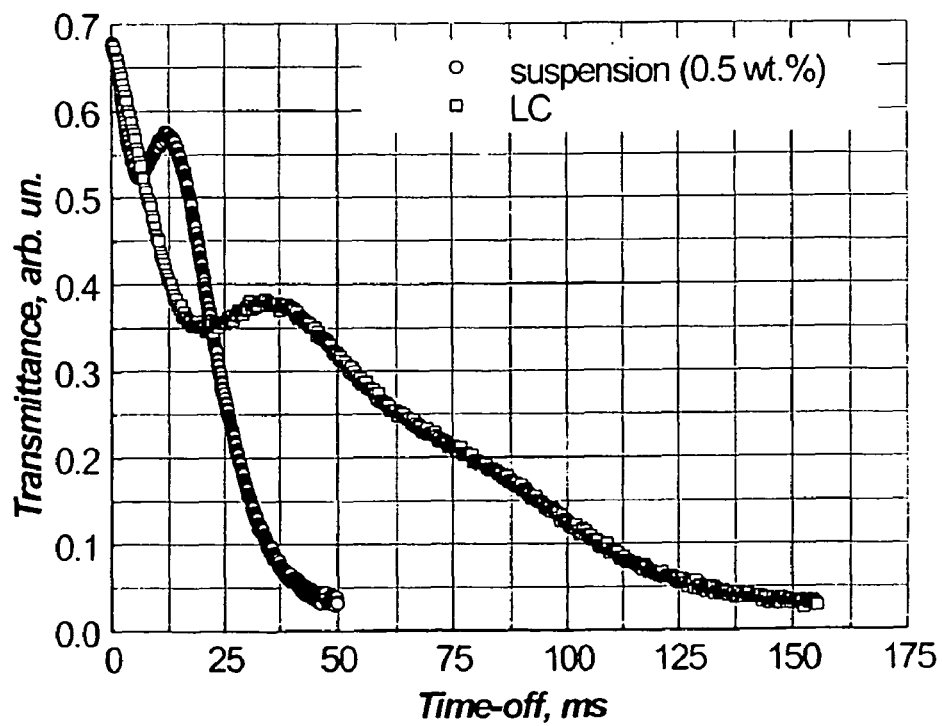
FIG. 2 is a graph showing the time-off characteristic the twist cell filled with ferroelectric particle/LC K15 suspension and pure LC K15.
Figure 3:
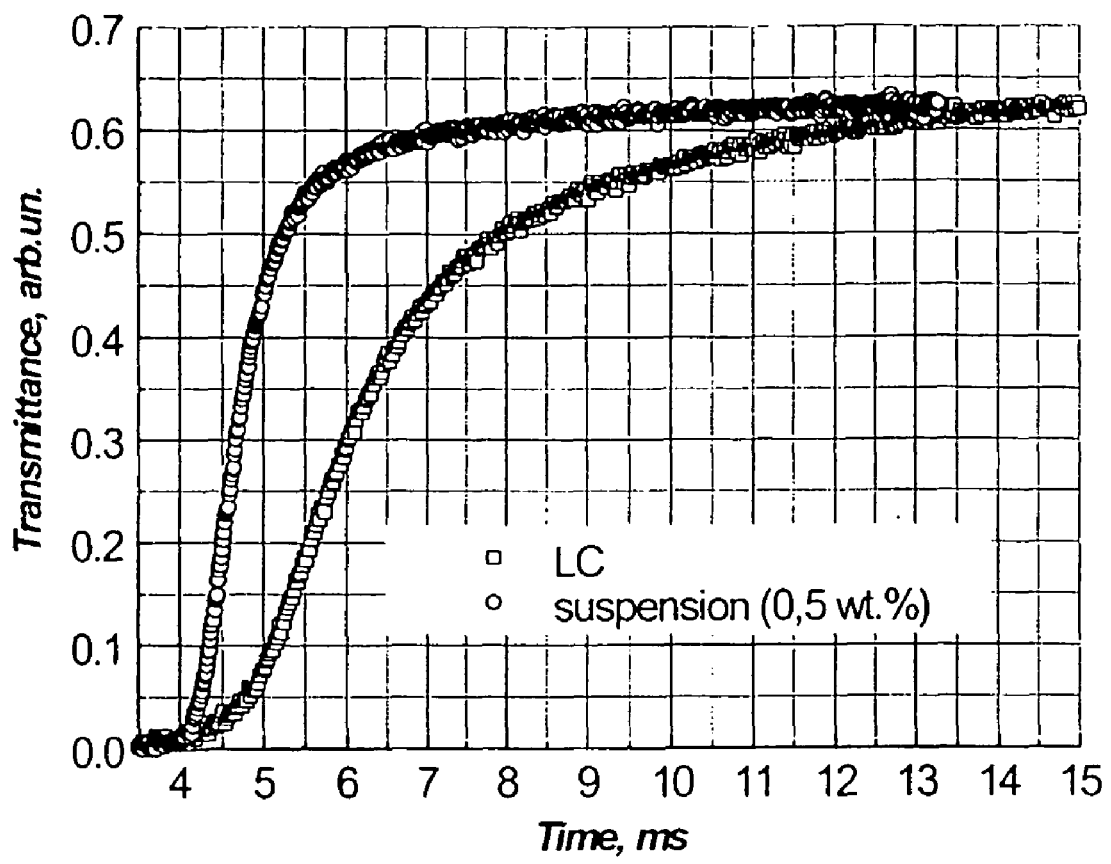
FIG. 3 is a graph showing the time-on characteristic the twist cell filled with ferroelectric particle/LC K15 suspension and pure LC K15.

The results obtained for the ferroelectric particle/LC suspension and an identical cell filled with pure LC are presented in FIGS. 1-3. FIGS. 1-3 show that doping the LC with ferro-particles lowers the driving voltage and reduces the response time of the LC cell. FIG. 1 shows that the threshold of the Fridericksz transition, $V_F$, defined as the voltage required to achieve 10% of the maximum transmittance ($T_{max}$) from a dark state decreases from 2.9 V to 2.2 V. As shown in FIG. 2, the decay time, defined as the time necessary to relax from $T_{max}$ to 10% of $T_{max}$, decreased from 140 ms to 40 ms. FIG. 3 shows that the rise time, that is, the time necessary to achieve 90% of $T_{max}$ from a dark state, decreased from 9.5 ms to 5.5 ms.

Ferroelectric powder $Sn_2P_2S_6$ (characteristic grain size 1 μm, $\in \approx 400$ was mixed with oleic acid surfactant (Aldrich) in a weight ratio of 1:2. The mixture was dispersed in an ultrasonic dispergator (UZDH-2T) (ν=22 kH, P=400 W) for 2 minutes followed by milling in a vibration mill (Fritsch Pulaerisette) for 118 hours.

The resulting powder of ferroelectric particles treated with oleic acid was mixed with the LC material ZLI 4801-000, available from Merck, in a weight proportion of 1:100. This mixture was dispersed in the ultrasonic dispergator (frequency ν=22 kH, power P=400 W) for 5 minutes. The resulting suspension contained about 1% weight percent of ferro-particles in LC matrix. The suspension was tested in a LC twist cell produced as described above.

Figure 4:
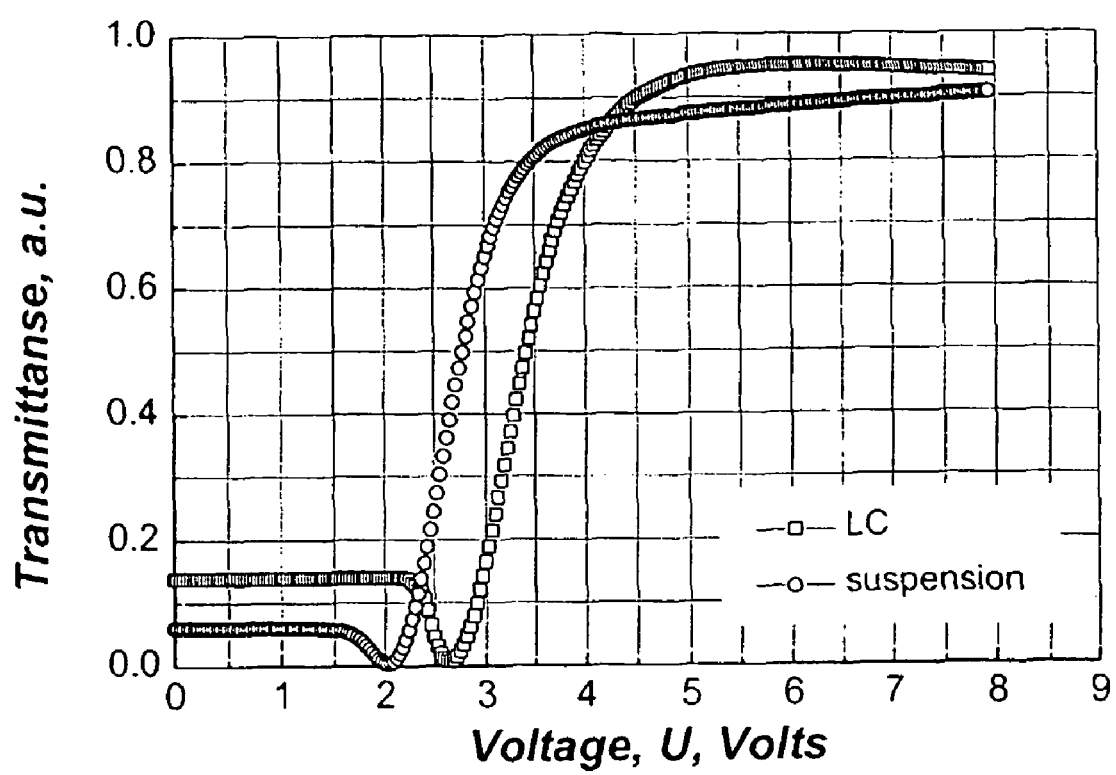
FIG. 4 is a graph showing the dependence of the transmittance of the twist cell filled with ferroelectric particle/LC 4801 suspension and pure LC 4801 on the applied ac-voltage.

The dependence of the transparency of the system, T, on the applied voltage, V, is presented in FIG. 4. The characteristics obtained for the same cell filled with pure ZLI 4801 are also presented in the FIG. 4. As in the case of LC K15, the doping of the LC with ferro-particles lowers the driving voltage and reduces the response time of the LC cell. The threshold of the Freedriks transition, $V_F$, decreases from 2.6 V to 2 V.

In another example, we obtained small (~10 nm) ferro-electric $Sn_2P_2S_6$ particles by milling larger particles (about 1 mm size). The larger ferro-electric particles were mixed with a solution of oleic acid (surfactant) in heptane in a weight ratio of 1:2:10 respectively, ultrasonically dispersed and ground in a vibration mill for 120 hours. The resulting ferro-electric particle suspension was mixed with the LC. The heptane was then evaporated and the mixture was ultrasonically dispersed for 5 min. The relative concentrations of components were adjusted to give a final suspension with about 0.3% by volume of ferro-particles.

Planar cells were filled with the LC suspension or pure LC at a temperature (T) greater than the clearing temperature ($T_c$). The clearing temperature is the temperature at or above which the liquid crystal material enters an isotropic liquid state and becomes transparent. The cells consisted of two ITO coated glass substrates with a rubbed polyimide layer assembled for parallel alignment. Calibrated, rod-like 5 μm polymer spacers controlled cell spacing.

Cells with the ferroelectric particle/LC suspension had identical alignment qualities as cells with pure LC. Within experimental error, the measured value of the pretilt angle was the same for both cells (3.5±0.5° C.). Also, the clearing temperature points, $T_c$, of the suspensions and the LCs were essentially the same, with the $T_c$, for the pure LC ($T_{c,LC}$) being 92.3° C., while the $T_c$, for the ferroelectric particle/LC suspension ($T_{c,susp}$) being 92.6° C.

Figure 5A:
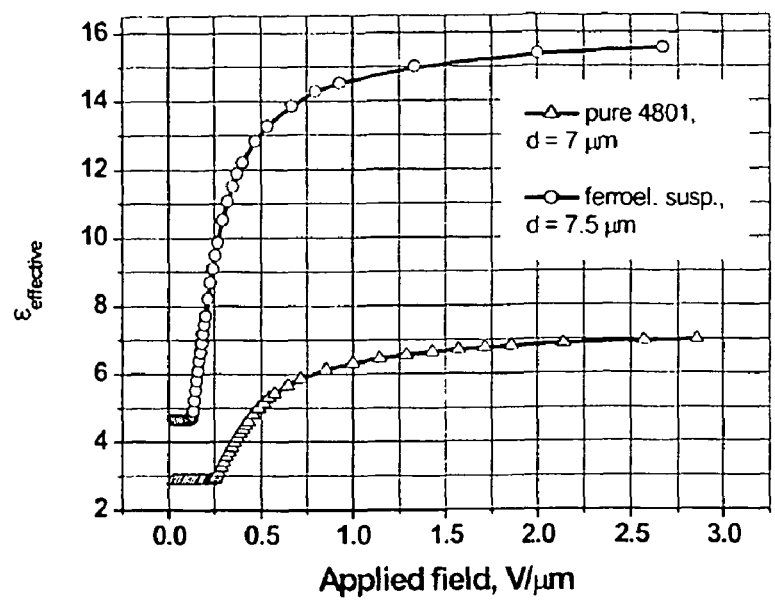
FIG. 5A is a graph showing the dependence of the effective dielectric constant $\epsilon^{eff}$ on the applied field of a ferroelectric particle LC suspension and pure LC.
Figure 5B:
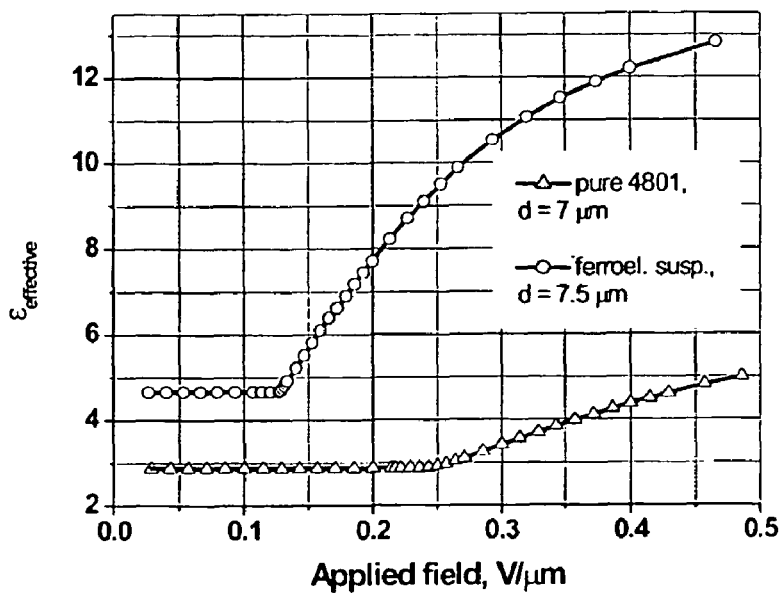
FIG. 5B is a graph showing the dependence of the effective dielectric constant $\epsilon^{eff}$ on the applied field of a ferroelectric particle LC suspension and pure LC within a narrower range than that of FIG. 5A.

The increase in the dielectric anisotropy of the suspension was verified by comparing the electro-optical response of the planar cell filled with the pure LC ZLI-4801 and a ferroelectric particle suspension with the same LC. The dependence of the effective dielectric constant $\in^{\mathit{eff}}$ of the LC on the applied field is shown in FIGS. 5A and 5B. FIG. 5A is a graph showing $\in^{\mathit{eff}}$ of a ferroelectric particle LC suspension and pure LC over an applied field range of up to about 3 V/μm. FIG. 5B shows $\in^{\mathit{eff}}$ up to about 0.5 V/μm. FIGS. 5A and 5B show that the threshold voltage of the Freedericksz transition for the suspension ($V_{th}^{susp}$) is about 0.91V, which is about half that for the pure LC ($V_{th}^{LC}$), 1.87V.

$Sn_2P_2S_6$ has a low Curie temperature, $T_{Curie} \approx 66°$ C., which is below the clearing temperature, $T_c$, of many nematic liquid crystal mixtures. For example, the nematic LC mixture ZLI-4801 (Merck) has a $T_c = 93°$ C.

Figure 6:
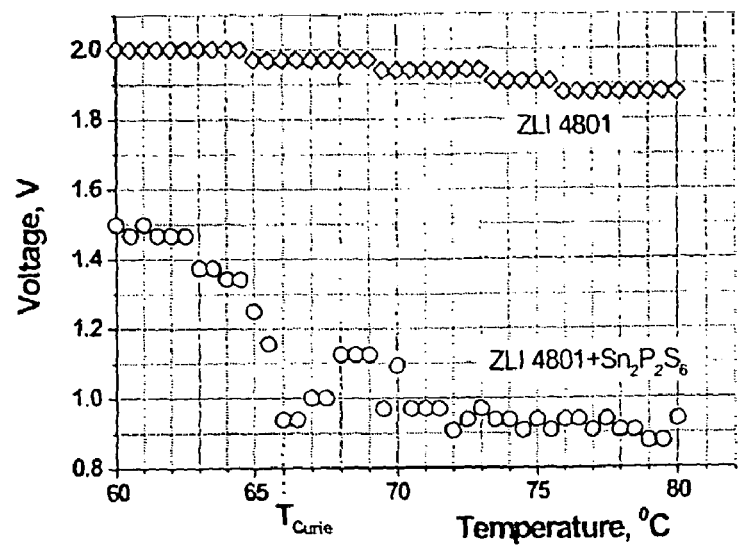
FIG. 6 is a graph comparing the threshold voltage as a function of temperature for cells filled with the suspension of the present invention and cells filled with pure liquid crystal.

The influence of the ferroelectric particles on the LC material is clearly revealed by the change in the electro-optic response with temperature. The pure LC threshold voltage gradually decreases with temperature because of the weak temperature dependence of $K/\in_{LC} \cdot (T)$. The threshold voltage for the suspension also decreases with temperature because of the weak temperature dependence of $K/\in_{LC} \cdot (T)$. However, the unique dielectric properties of the ferro-electric/LC suspensions become apparent at the Curie temperature of the $Sn_2P_2S_6$, where the threshold voltage for the suspension changes abruptly, as shown in FIG. 6. This is believed to be the result of the critical behavior of the dielectric anisotropy at this temperature. An experimental value of the Curie temperature determined from FIG. 6 was about 66° C., which is exactly the same as that determined for the bulk $Sn_2P_2S_6$ crystals.

Figure 7:
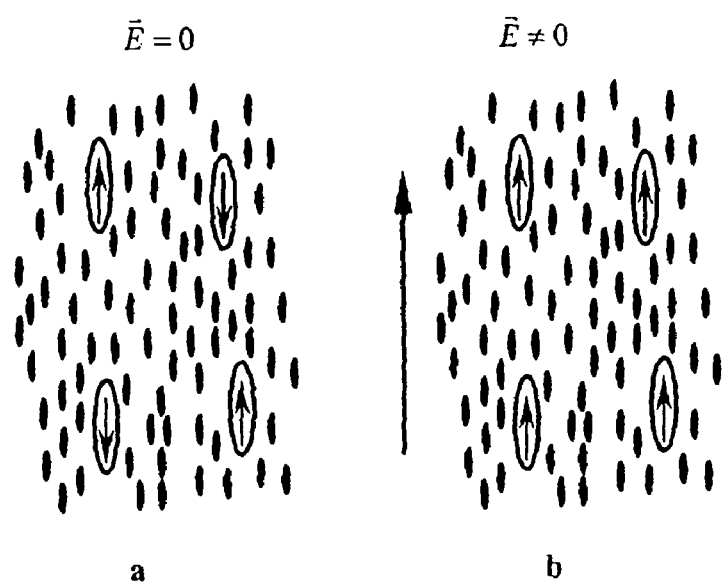
FIG. 7A is a schematic representation of a suspension of ferroelectric particles in a liquid crystal according to the present invention in the absence of an electric field.
FIG. 7B is a schematic representation of a suspension of ferroelectric particles in a liquid crystal according to the present invention in the presence of a direct current electric field.

While not wishing to condition patentability on any particular theory of operation of the present invention, one theory of operation is shown in FIGS. 7A and 7B. The permanent dipoles in the LC/particle suspension are believed to be randomly aligned in a head to tail fashion (FIG. 7A). Therefore, in order to realize the ferro-electric properties of the particles, we applied a large dc-electric field, sufficient to break the symmetry and align the particle dipoles along the field (FIG. 7B). A low frequency ac-field applied perpendicular to the dc field rotates the particles right or left depending on the sign of the applied field. The resulting linear component of the electro-optic response of the suspension will be proportional to both the polarizing, dc-, and the deflecting ac-fields.

Figure 8A:
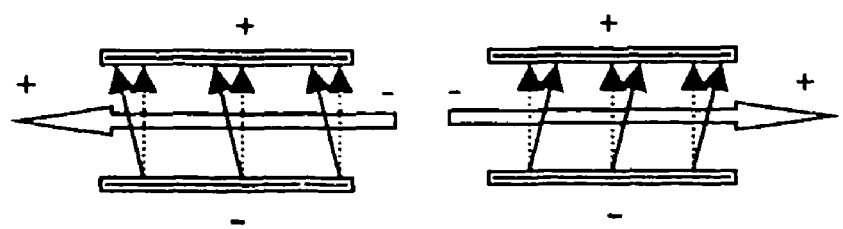
FIG. 8A is a schematic representation of a cell according to one embodiment of the present invention, wherein an ac-field is applied in the plane of the cell and a dc-field is applied perpendicular to the plane of the cell.

To demonstrate the unusual linear response of a nematic LC to an electric vector we studied the electro-optic response of a liquid-crystal cell composed of one substrate with a continuous ITO conducting surface and one with interdigitated ITO electrodes with a 1 millimeter (mm) distance between lines allowing application of an in-plane field. Both substrates were identically treated for homeotropic alignment of 4-4'-pentylcyanobiphenyl (5CB). An ac-field $E_{ac}$ (0-100V over a distance of 1 mm, 1 kHz) was applied in the plane of the cell and the dc-field $E_{dc}$ (0-30V over a distance of 10 μm) was applied perpendicular to the plane of the cell (along the director of the suspension). The voltage of the ac-field was below the voltage of the Freedericksz transition. A schematic representation of such a cell is shown in FIG. 8A. The ac-field is applied in the plane of the cell and the dc-field is applied perpendicular to the plane of the cell (along the director of the suspension).

Light from a He—Ne laser was passed through a polarizer, the cell, a crossed analyzer and then into a photodiode detector. The beam was narrow enough to pass through the 1 mm inter-electrode gap in the cell. The cell was tilted at 45° with respect to the beam and the interdigitated electrodes are aligned 45° to the beam polarization direction. The detector output, proportional to the total light intensity (I), was fed into a lock-in amplifier referenced to the ac driving voltage $U_{ac}$ (w). The key to this experiment is the 45° angle of the cell relative to the beam, producing a different optical retardation for right or left rotation of the suspension resulting from opposite signs of the ac field.

Figure 8B:
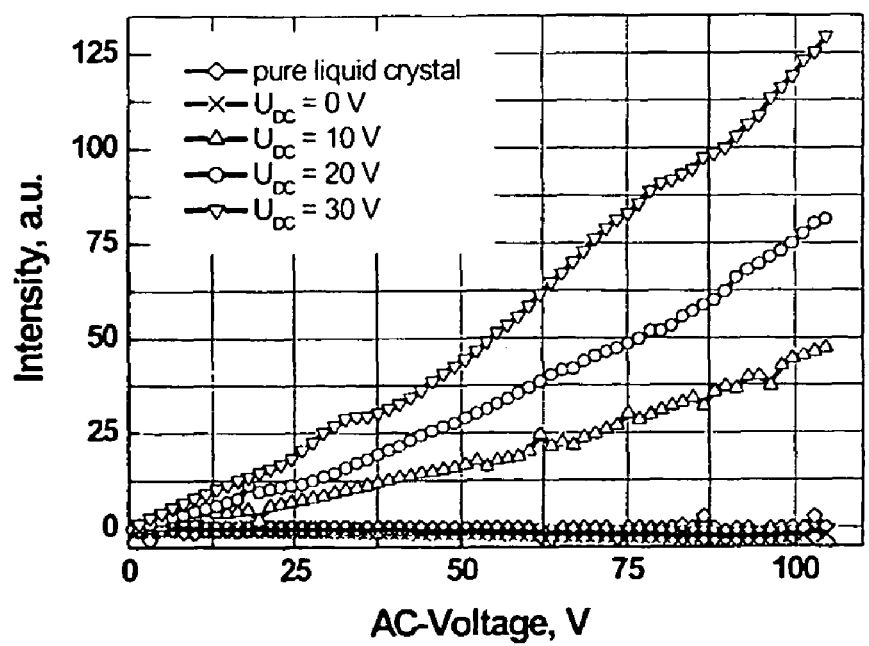
FIG. 8B is a graph showing the dependence of the linear component of the electro-optic response of the suspension and the pure LC as a function of the applied ac-voltage for different values of the polarizing dc-field.

The dependence of the linear component of the electro-optic response of the suspension and the pure LC as a function of the applied ac-voltage (n=200 Hz) for different values of the polarizing dc-field is shown in FIG. 8B. The pure LC responds only to the magnitude and not the sign of the field for the whole dc field range and therefore shows no response in this arrangement. There was also no linear response of the suspension when no dc-field was applied. Application of the dc-field resulted in appearance of the sign-sensitive component of the electro-optical response, which increased proportionally to both the magnitude of the dc- and the ac-field. Switching off of the dc-field resulted in the fast disappearance of the linear response, and is believed to be caused by the disordering of the ferro-electric particles by thermal fluctuation. In this way, the present invention provides a liquid crystal suspension that responds not only to the direction of the field but to the sign of the field as well. It is envisioned that the present invention will be useful in bistable displays, wherein the display state of a cell may be switched rapidly from one state to another by changing the polarity of the applied field.

The examples given above are intended to be illustrative only and the present invention was not limited to the conditions and materials noted therein. Various modifications can be achieved within the technical scope of the present invention. For example, the ferroelectric LC suspensions are not limited to a nematic matrix. Cholesteric LC's and any kind of smectic LC can be a base of ferroelectric/LC suspensions. Also, ferroelectric/LC suspensions can be used as a LC material in Polymer Dispersed Liquid Crystal Devices.

What is claimed is:

1. A liquid crystal device comprising a mixture of ferroelectric particles and a surfactant, wherein said mixture is suspended directly in a liquid crystal material, and a pair of opposed substrates, each substrate having an electrode facing the other substrate, wherein said mixture suspended in the liquid crystal material is disposed between said pair of substrates.

2. The liquid crystal device according to claim 1, additionally comprising a polymer.

3. The liquid crystal device according to claim 1, wherein the device is selected from an electro-optical device and an information display device.

4. The liquid crystal device according to claim 1, wherein one of said pair of opposed substrates has a single continuous electrode and the other of said pair of opposed substrates has an interdigitated electrode that can be used to produce an in-plane electric field.

5. The liquid crystal device according to claim 1, wherein said electrodes are selected from the group consisting of indium oxide and indium tin oxide.

6. The liquid crystal device according to claim 1, wherein said ferroelectric particles are selected from the group consisting of $LiNbO_3$, $PbTiO_3$, $BaTiO_3$, $Sn_2P_2S_6$ and CTBS-3.

7. The liquid crystal device according to claim 1, additionally comprising an alignment material layer disposed on each of said electrodes.

8. The liquid crystal device according to claim 1, additionally comprising: a pair of opposed substrates, each substrate having an electrode facing the other substrate; wherein said ferroelectric particles suspended in a liquid crystal material are disposed between said pair of substrates; and further wherein the liquid crystal material is selected from the group consisting of nematic liquid crystals, cholesteric liquid crystals, and smectic liquid crystals.

9. The liquid crystal device according to claim 1, wherein said ferroelectric particles are suspended in the liquid crystal material at a percentage of about 0.5 percent by weight or less compared to the liquid crystal material.

10. A liquid crystal device comprising a mixture of ferroelectric particles and a surfactant suspended directly in a liquid crystal material, and a pair of opposed substrates, each substrate having an electrode facing the other substrate, wherein said mixture suspended in the liquid crystal material is disposed between said pair of substrates, and wherein said particles are smaller than 1 µm in any dimension, on average, and said ferroelectric particles are suspended in the liquid crystal material at a percentage of about 1 percent by weight or less compared to the liquid crystal material.

11. A method for fabricating a light-modulating device, the method comprising the steps of: providing a pair of substrates with a cell gap therebetween, wherein electrodes are disposed on the facing surfaces of the substrates; and permanently disposing a suspension of ferroelectric particles in a liquid crystal material into said cell gap.

12. The method for fabricating a light-modulating device according to claim 11 wherein a layer of alignment material is disposed on said electrodes.

13. The method for fabricating a light-modulating device according to claim 11, wherein at least one of said electrodes is a transparent electrode.

14. The method for fabricating a light-modulating device according to claim 13, wherein the at least one transparent electrode is selected from the group consisting of indium and indium tin oxide.

15. The method for fabricating a light-modulating device according to claim 11, wherein said suspension of ferroelectric particles in a liquid crystal material is fabricated by a process including the steps of: milling grains of a ferroelectric powder with a slow evaporating liquid carrier and a surfactant agent to create a raw suspension; separation of the raw suspension into different fractions based on the size of the milled ferroelectric particles therein; mixing a desired fraction with a liquid crystal material; and removal of the carrier from the mixture of the desired fraction and liquid crystal material.

16. The method for fabricating a light-modulating device according to claim 11, wherein said suspension of ferroelectric particles in a liquid crystal material additionally comprises a polymerizable material and wherein said method additionally comprises the step of inducing polymerization of the polymerizable material.

17. The method for fabricating a light-modulating device according to claim 11, wherein said suspension of ferroelectric particles in a liquid crystal material additionally comprises a thermoplastic polymeric material and wherein said method additionally comprises the step of inducing phase separation of the polymer and liquid crystal by cooling of the mixture.

18. A method of generating an image, comprising: providing a pair of substrates with a cell gap therebetween; providing transparent electrodes on each of said substrates adjacent to said cell gap; permanently disposing a suspension of ferroelectric particles in a liquid crystal material within said cell gap; and applying an electric field across said electrodes.

19. The method of generating an image according to claim 18, wherein said suspension of ferroelectric particles in a liquid crystal material further comprises a polymerizable material which is induced to polymerize subsequent to disposition within said cell gap and prior to said application of an electric field across said electrodes.

20. A liquid crystal device comprising a mixture of ferroelectric particles and a surfactant suspended directly in a liquid crystal material, and a pair of opposed substrates, each substrate having an electrode facing the other substrate, wherein said mixture suspended in the liquid crystal material is disposed between said pair of substrates, and wherein said ferroelectric particles are suspended in the liquid crystal material at a percentage of about 4 percent by weight or less compared to the liquid crystal material.

21. A liquid crystal device comprising: a mixture of ferroelectric particles and a surfactant, wherein said mixture is suspended directly in liquid crystal material, and a pair of opposed substrates, each substrate having an electrode facing the other substrate, wherein said mixture suspended in the liquid crystal material is disposed between said pair of substrates, and wherein said ferroelectric particles are selected from $PbTiO_3$.

22. A liquid crystal device comprising a mixture of ferroelectric particles and a surfactant suspended directly in a liquid crystal material, and a pair of opposed substrates, each substrate having an electrode facing the other substrate, wherein said mixture suspended in the liquid crystal material is disposed between said pair of substrates, and wherein said ferroelectric particles are selected from the group consisting of $LiNbO_3$, $PbTiO_3$, $Sn_2P_2S_6$ and CTBS-3.

23. The liquid crystal device according to claim 1, in which the liquid crystal material is selected from nematic, chiral nematic, and smectic liquid crystal materials.

24. The liquid crystal device according to claim 1, wherein said particles have an average diameter of 20 nm or less.

* * * * *